June 16, 1964  N. C. TURNBULL ETAL  3,137,751
CASTING OF ABRASIVE MATERIAL
Filed Jan. 29, 1962

INVENTORS.
NEIL C. TURNBULL
STEVEN J. ROSCHUK

ATTORNEY 3,137,751
CASTING OF ABRASIVE MATERIAL
Neil C. Turnbull, Niagara Falls, Ontario, and Steven J. Roschuk, Fonthill, Ontario, Canada, assignors to Norton Company, Worcester, Mass., a corporation of Massachusetts
Filed Jan. 29, 1962, Ser. No. 169,396
6 Claims. (Cl. 264—336)

Abrasive materials, in particular hard refractory abrasive metal oxides such as alumina, are customarily fused in an electric arc furnace such as a Higgins furnace as described in U.S. Patent No. 775,654. In a batch type process, when the fusion is completed, the electrodes are removed, the power is turned off and the pig of molten material thus formed is allowed to cool in the furnace shell. Since this batch type of operation is inefficient for a variety of reasons, casting furnaces which operate more or less continuously (a flow process), and are tapped at regular intervals, have been introduced to the art and have been successful in certain limited applications. In other instances, however, it has been found impractical to apply the casting technique. Thus the disadvantages of the batch type Higgins furnace have remained with the industry where the casting furnace technique has proven unsatisfactory.

It is an object of the invention to provide a means for handling molten material from a casting furnace to achieve end results which heretofore have been achieved in the batch type operation.

It is a further object to provide a means for controlling the cooling rate of high temperature molten materials.

Another object of this invention is to provide a method for producing castings of molten material of controlled crystal structure and free of contamination.

The above and other objects are achieved by providing a temporary mold surrounded by flowable granular insulating material in which mold the molten material is contained only long enough for the surface of the casting to cool sufficiently so that it can maintain its shape without the support provided by the mold material.

One method of achieving these ends is by providing a mold having removable and reusable side walls adapted to be lifted away from the molten material a short time after the tap is completed.

The accompanying drawings illustrate specific apparatus suitable for carrying out the present invention.

Figure 1:
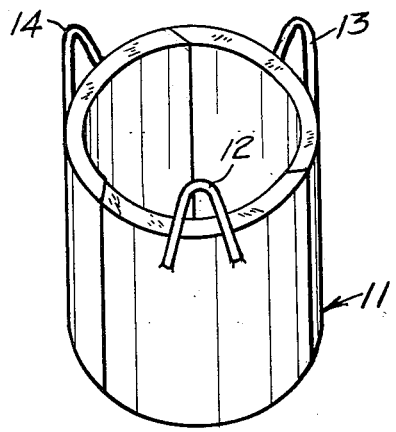
Figure 2:
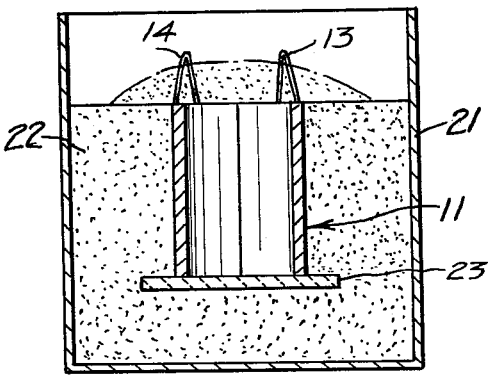
Figure 3:
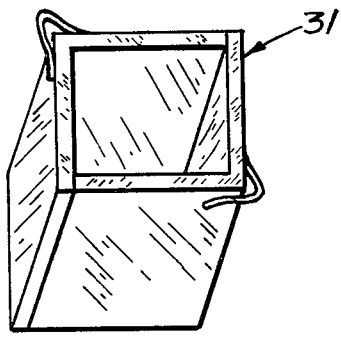

FIGURE 1 illustrates a three part mold;
FIGURE 2 shows the mold in position and set up for receiving a pour; and
FIGURE 3 shows a two part rectangular mold adapted to be used in the same manner as the mold of FIGURE 1.

One specific application of the invention is in the production of standard aluminum oxide abrasive grain from bauxite. In the past this process has been carried out in a batch type of arc furnace. In such furnaces a fusion of bauxite mixed with coke and iron borings was carried out. In this process the coke reduces the iron oxides, silica and some titania to their respective metals and the iron borings melt and carry the other reduced metals to the bottom of the furnace where a metal button is formed. The steel furnace shell is water cooled on the outside and is protected in the inside by a refractory lining formed during the fusion. Upon completion of the fusion the reacted material is allowed to cool in the furnace and when sufficiently cool is broken up and the well-fused alumina is separated from the partially fused and unfused materials and the resultant metal phase. The separation process is essentially a hand operation which is both inefficient and difficult, and hence costly. In addition, the furnace shell is unavailable for use during the cooling of the melt. Although casting furnaces are known to the art (see U.S. Patents 2,426,643 and 2,579,-885), prior to the present invention, it has not been practicable to produce large castings from such furnaces. Thus, although a tap could be made of the desired molten alumina free of unreacted materials and any metal phase, the desirable slow cooling rate, previously achieved in the large batch furnaces, could not be achieved. As a result the casting technique has not been practical where a product having relatively large crystals, produced by slow cooling, is desired.

Since molten abrasive materials melt at temperatures of from around 1800° C. and up, only relatively small castings can be poured into molds of conventional materials by conventional techniques. Cast iron ingot molds can be used, for example, when the size of the casting is a few hundred pounds or less and where slow cooling is not essential. In such cases the mass of the mold is large enough to quick chill the casting, that is to absorb sufficient heat from the casting to avoid fusion or damage to the mold, even though the mass of molten material is at a temperature above the melting point of the mold. As a result, where slow cooling and a resulting larger average crystal size in the solidified mass was required, it was necessary to resort to the batch type furnace operation. Although materials are available which have melting points above the temperature of molten alumina and similar refractories, such materials are unsuitable or impractical for use as mold material because of such factors as chemical reaction with the molten alumina, sticking, lack of mechanical strength, or great expense.

In accordance with the present invention it has been found that non-refractory materials such as metals which melt below 1600° C., which would be unsuitable as a mold, if used in a conventional manner, may effectively function as a container for large castings if the non-refractory material is removed from the casting soon after the tap is completed.

In a typical operation of the invention, the molten alumina is poured from the casting furnace into a three piece cylindrical cast iron mold 11 such as illustrated in FIGURE 1. The mold is positioned in a container 21 as shown in FIGURE 2 and is surrounded by a refractory insulating material 22 preferably of the same composition as the fusion, in loose grain or bubble form. The mold rests on a graphite bottom 23 which may be one piece or may be made of several segments.

A short time after the pour is completed, the mold is removed by means of hooks attached to lugs 12, 13, and 14. As the mold sides are lifted from the casting, the flowable insulating material will fall into the space vacated by the mold sides and aid the frozen walls of the casting in supporting the still molten interior. It has been found that in general, a wait of from 1 to 3 minutes after completion of the tap is sufficient. This time will depend of course, on the length of time required to complete the pour, the size of the ingot, the thickness of the mold, and the properties of the insulating material. In the case of large castings of the order of several thousand pounds, a solidified wall thickness of ¼ inch to 1 inch, in combination with the support provided by the insulation, will keep the casting intact. Removal of the mold as soon as possible eliminates the danger of damaging the mold plates. Surprisngly, when the timing of the operation is properly controlled, the mold is easily removed from the casting without any damage to the mold and with no contamination of the casting. In the case of very large castings weighing several tons, it has been found that although it may take several minutes to fill the mold, the mold may still be successfully removed without damage to it or the casting.

Instead of the mold of FIGURE 1, a rectangular, two part mold 31 such as shown in FIGURE 3 may be employed.

As indicated in FIGURE 2, a further blanket of insulation is poured on top of the casting after the pour is completed. Although, as illustrated, the insulation has been added before removal of the mold sides, some or all of such top insulation may be added immediately after removal of the mold sides.

The materials employed for the removable mold, the insulation, and the bottom of the mold may be judiciously chosen by one skilled in the art. However, for practical purposes and conveinence it has been found that the removable portion of the mold may conveniently be steel or cast iron and for the bottom plate graphite appears to be quite suitable. In some applications the graphite plate is not required and lumps or grains simliar in composition to material being cast are substituted. It is desirable to coat the inside surfaces of the removable portion of the mold with a refractory wash to prevent contamination of the casting and to facilitate mold removal where molten alumina is to be tapped it has been found that a wash made up of finely divided alumina in a sodium silicate solution diluted with water, thinly painted or sprayed on the inside surfaces and allowed to dry is suitable. Obviously where other types of molten refractories are to be cast, analogous washes could be employed.

In the case of aluminum oxide castings, bauxite, purified (Bayer process) alumina, alumina grain or bubbles or any other non-contaminating material may be employed as the insulating material. In addition the type of insulation will depend on the desired cooling rate. The material should be granular and flowable.

The thickness of the removable portion of the mold, in part at least, governs the maximum time that the mold can remain in contact with the hot ingot. For castings of around 1,000 pounds we have found that a 1" thicknes of mild steel is sufficient. For larger castings of one ton or more, since the tap itself may take several minutes, we have employed cast iron molds of up to 2½" in thickness.

In general, where the technique of this invention is employed to cast an ingot which will be crushed to produce abrasive grains, a slow cooling of the ingot is desired. Therefore, a good blanket of insulation, at least 6" deep around the ingot is desirable.

The removable mold need not be cylindrical, nor of course need it be exactly three pieces. FIGURE 3 illustrates a two-piece square mold 31 which has been successfully employed. When large castings e.g. 8000 lbs. are made to be crushed for abrasive or refractory grain, we prefer to employ a cylindrical mold.

The technique of this invention is also applicable to the casting of ingots of alumina in a disintegratable sulfide matrix as disclosed in Ridgway patent and the co-pending application of S. J. Roschuk, filed October 20, 1961, Serial No. 146,445, entitled "Crystalline Alumina."

Where removable metal molds are employed in accordance with the teachings of this invention, very large uncontaminated castings can be produced. The initial chilling and the subsequent cooling rate of the casting can be closely controlled by controlling the length of time of the tap, the time of removal of the mold, and the amount of insulation employed. The molds themselves are relatively easily set up, low in cost, long life, and may be reused immediately after being pulled from a casting, thus reducing the total number of molds required.

We claim:
1. A process for casting molten refractory material comprising the steps of:
 (1) pouring the molten material into a mold which is charcterized by
  (a) having removable segments
  (b) which melt at a temperature lower than the temperature of the molten material, and
 (2) removing the segments of the mold
  (a) after surrounding the mold with a flowable refractory insulating material
  (b) after a solidified wall has formed around the ingot, and
  (c) prior to fusion of the removable sides of the mold.
2. A process as in claim 1 in which the mold is surrounded by a refractory insulating material which is inert with respect to the molten material.
3. A process as in claim 2 in which the mold is surrounded by an insulating material of the same composition as said molten material.
4. A method for controlling the cooling rate of a high melting point molten material to recover the uncontaminated solid crystalline mass comprising:
 (1) containing said molten material in a supporting container which provides bottom and side supporting surfaces for said molten material and which is surrounded by a flowable refractory insulating material
 (2) removing the side supporting surfaces as soon as the molten mass has cooled for a time sufficient for a solidified skin to have formed around said ingot.
5. A method as in claim 4 wherein the side supporting surfaces are formed of material having a melting point substantially lower than the temperature of the molten material when it is initially contained.
6. A method as in claim 4 wherein the flowable refractory insulating material is of the same composition as said molten material and intimately surrounds said mass upon removal of the containing side surfaces.

References Cited in the file of this patent
UNITED STATES PATENTS

| | | |
|---|---|---|
| 753,694 | Garchey | Mar. 1, 1904 |
| 1,171,579 | Atterbury | Feb. 15, 1916 |
| 2,057,786 | Mills | Oct. 20, 1936 |
| 2,274,105 | Stewart et al. | Feb. 24, 1942 |
| 2,596,573 | Luebkeman | May 13, 1952 |